(12) United States Patent
Withers

(10) Patent No.: US 7,793,968 B1
(45) Date of Patent: Sep. 14, 2010

(54) INTEGRATED SUPPORT STRUCTURE FOR EITHER A FIFTH WHEEL HITCH OR A GOOSENECK TRAILER HITCH

(75) Inventor: Sean Withers, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/489,657

(22) Filed: Jun. 23, 2009

(51) Int. Cl.
B60F 1/00 (2006.01)

(52) U.S. Cl. .................. 280/496; 280/415.1; 280/425.2; 280/491.5

(58) Field of Classification Search .............. 280/476.1, 280/415.1, 417.1, 425.2, 495, 496, 491.5
See application file for complete search history.

(56) References Cited

U.S. PATENT DOCUMENTS

| 2,402,254 | A | 6/1946 | Maddock et al. |
|---|---|---|---|
| 2,647,761 | A | 8/1953 | Kentz |
| 3,336,050 | A | 8/1967 | Dale |
| 3,336,051 | A | 8/1967 | Dale |
| 3,390,896 | A | 7/1968 | Philaphy |
| 3,527,476 | A | 9/1970 | Winckler |
| 4,256,323 | A | 3/1981 | McBride |
| 4,546,994 | A | 10/1985 | Taylor |
| 4,643,443 | A | 2/1987 | Husa |
| 5,143,393 | A | 9/1992 | Meyer |
| 5,513,869 | A | 5/1996 | Putnam |
| 5,529,329 | A | 6/1996 | McCoy |
| 6,065,766 | A | 5/2000 | Pulliam |
| 6,158,761 | A | 12/2000 | King |
| 6,357,777 | B1 | 3/2002 | Linger et al. |
| 6,447,000 | B1 | 9/2002 | Dick et al. |
| 6,467,791 | B1 | 10/2002 | Fandrich et al. |
| 6,502,846 | B2 | 1/2003 | Fandrich et al. |
| 6,520,528 | B2 | 2/2003 | Fandrich et al. |
| 6,805,379 | B2 | 10/2004 | Nommensen |
| D499,010 | S | 11/2004 | Velten |
| D499,050 | S | 11/2004 | Lindenman et al. |
| 6,824,157 | B1 | 11/2004 | Putnam |
| 7,121,573 | B2 | 10/2006 | Lindenman et al. |
| 7,140,633 | B2 | 11/2006 | Audo et al. |
| 7,147,420 | B2 | 12/2006 | Baus et al. |
| 7,234,905 | B2 | 6/2007 | Warnock |
| 7,261,311 | B2 | 8/2007 | Lindenman et al. |
| 7,264,259 | B2 | 9/2007 | Lindenman et al. |
| D596,921 | S | 7/2009 | Hageman et al. |
| 2004/0021290 | A1 | 2/2004 | Hicks et al. |
| 2009/0085326 | A1 | 4/2009 | Linger et al. |
| 2009/0295122 | A1* | 12/2009 | Withers et al. ........... 280/476.1 |

* cited by examiner

Primary Examiner—Tony H. Winner
(74) Attorney, Agent, or Firm—Frederick Owens; Brooks Kushman P.C.

(57) ABSTRACT

An integrated support structure apparatus is provided for attaching either a fifth wheel trailer hitch or a gooseneck trailer hitch to a truck bed. The integrated support structure comprises an H-shaped body that is attached to at least one truck frame rail below the truck bed. A gooseneck ball receiver is attached to a central portion of the body and aligned with a gooseneck opening in the truck bed. A plurality of mounting pads are formed integrally as part of a plurality of end inserts that are assembled to the body.

15 Claims, 5 Drawing Sheets

INTEGRATED SUPPORT STRUCTURE FOR EITHER A FIFTH WHEEL HITCH OR A GOOSENECK TRAILER HITCH

BACKGROUND OF THE INVENTION

1. Technical Field

This invention is directed to a trailer hitch mounting structure for a pick-up truck that may receive a gooseneck hitch or a fifth wheel hitch. The gooseneck hitch and fifth wheel hitch may both be disassembled from the pick-up truck bed to allow for unobstructed use of the truck bed.

2. Background Art

Trucks may be used to pull a trailer with a frame mounted bumper hitch, a frame mounted fifth wheel hitch, or a frame mounted gooseneck hitch mounted in the pick-up bed. Fifth wheel and gooseneck hitches allow for larger trailers and provide considerably more stability than traditional bumper-pull hitches. Fifth wheel and gooseneck hitches are more stable because they are connected to the truck above the rear axle so that the added load of the trailer is applied to rear axle and the pivot of the trailer is at or slightly in front of the rear axle.

Gooseneck hitches are designed to receive a trailer on a ball that is connected to the frame of the pick-up truck. The ball is mounted low in the bed for stability. Some fifth wheel hitch mounts may provide an adapter for a gooseneck hitch to attach a trailer that has the gooseneck type trailer hitch. A gooseneck adapter on a fifth wheel mount raises the height of the gooseneck ball, and usually obstructs more of the pick-up bed.

There is a need for an integrated support structure that is disposed beneath the bed of a pick-up truck so that the bed of the truck is not obstructed and to which either a fifth wheel hitch or a gooseneck hitch can be easily assembled.

SUMMARY OF THE INVENTION

According to one aspect of the disclosed apparatus, an apparatus is provided for attaching either a fifth wheel trailer hitch or a gooseneck trailer hitch to a truck bed. The apparatus includes a body attached to truck frame rails below the truck bed. A gooseneck ball receiver is attached to a central portion of the body and is aligned with a gooseneck ball receiver opening in the truck bed. A plurality of mounting pads are integrated into end inserts that are assembled to the body. The mounting pads are disposed in a symmetrical array and are aligned with a corresponding plurality of pedestal access openings in the truck bed.

According to another aspect of the disclosed apparatus, an integrated support structure is provided for hitching a trailer to a truck bed. The support structure comprises the body that is attached below the truck bed. A mechanism is provided for selectively securing a gooseneck trailer hitch to the body. In addition, pedestal mounting pads are cast or otherwise integrally formed as part of end inserts that are secured to the body. The mounting pads are used to selectively secure a fifth wheel receiver pedestal to the truck bed. The mounting pads extend above the upper surfaces of end inserts and through access openings in the truck bed. Depending upon the type of trailer hitch, it may be hitched to either the gooseneck ball receiver trailer hitch or the fifth wheel receiver pedestal.

According to other features of the disclosed apparatus, the gooseneck trailer hitch receiver may be a gooseneck ball receiver that is attached to the body. The mounting pads that secure a fifth wheel receiver pedestal to the truck bed are integrated into end inserts that are assembled to the body.

According to still further features of the disclosed apparatus, a fifth wheel pedestal may be provided that is selectively attached to the plurality of mounting pads through the pedestal access openings. The truck bed is unobstructed when the fifth wheel pedestal is not attached to the plurality of mounting pads. The body may be generally H-shaped and each of the mounting pads may be integrally formed as part of the end inserts that are assembled to ends of H-shaped body portion. The gooseneck ball receiver may be attached to the cross bar of the H-shaped body portion. The center of the gooseneck ball receiver is preferably disposed forward of a rear axle that is located below the truck bed. The center of the array of mounting pads may be disposed forward of the rear axle that is below the truck bed. More specifically, the H-shaped body portion may have a front transverse bar portion and a rear transverse bar portion that are interconnected by the central portion of the body. Two end inserts having integral mounting pads are assembled to the front transverse bar portion and two end inserts having integral mounting pads are assembled to the rear transverse bar portion.

These and other aspects of the disclosed apparatus will be better understood with reference to the attached drawings and the following detailed description of the illustrated embodiment.

DETAILED DESCRIPTION OF THE PREFERRED EMBODIMENT(S)

Figure 1:
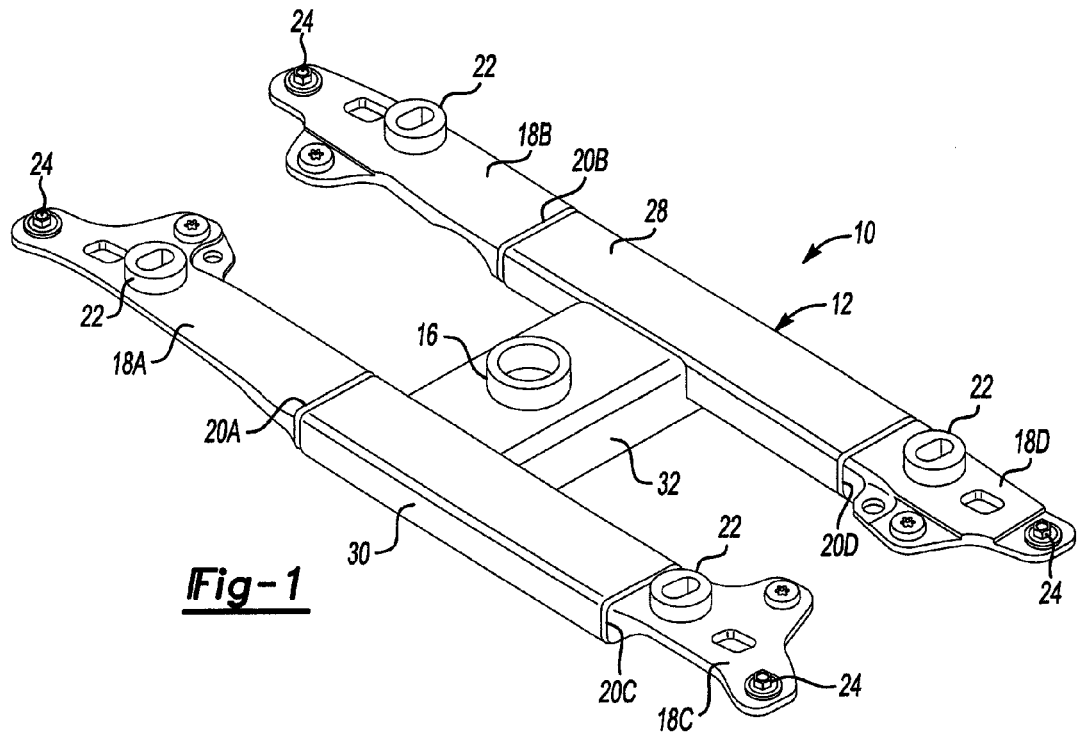
FIG. 1 is a perspective view of an integrated support structure for either a fifth wheel hitch or a gooseneck trailer hitch shown with end inserts including integral mounting pads.

Referring to FIG. 1, an integrated support structure 10 for either a fifth wheel hitch or a gooseneck trailer hitch (hereinafter the support structure assembly 10) is illustrated in isolation from the vehicle. The support structure assembly 10 includes a H-shaped body portion 12. The H-shaped body portion 12 may be fabricated from several tubular members or may also be fabricated as a two-piece stamped assembly. A gooseneck ball receiver 16 is shown assembled to the body portion 12 at a central location on the body portion 12. The gooseneck ball receiver 16 comprises a quick connect receptacle. Four end inserts 18A-D are shown inserted into four tubular ends 20A-D of the body portion 12. The end inserts 18A-D connect the support structure assembly 10 to a vehicle frame (shown in FIG. 3). Pedestal mounting pads 22 are integrally formed as part of the end inserts 18A-D in a casting operation.

The H-shaped body portion 12 includes a front transverse bar portion 28 and a rear transverse bar portion 30. A central bridging portion 32 is provided between the front and rear transverse bar portions 28, 30.

Figure 2:
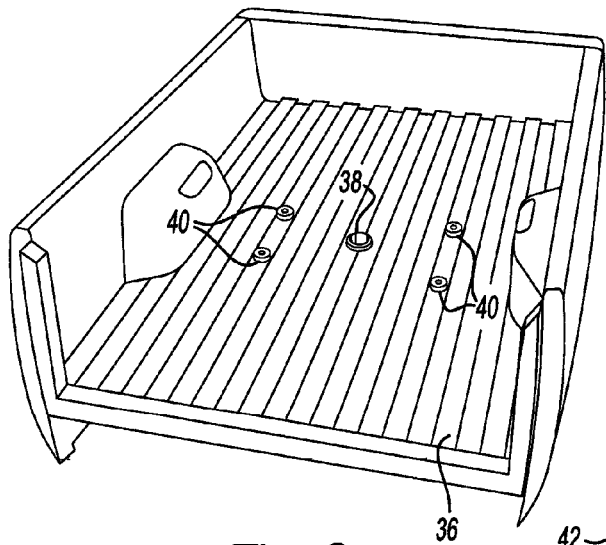
FIG. 2 is a rear perspective view of a pickup truck bed provided with the support structure shown in FIG. 1.
Figure 3:
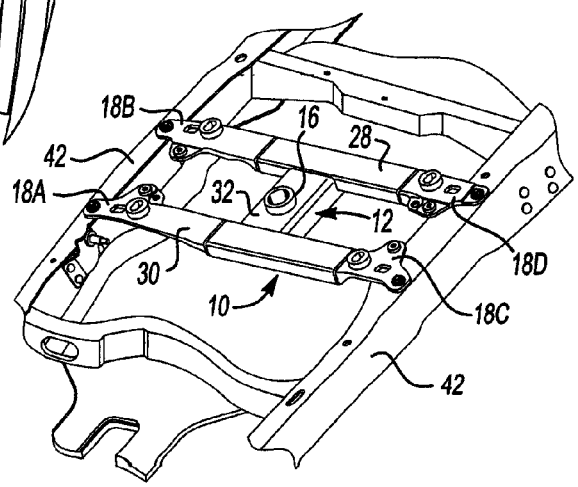
FIG. 3 is a rear perspective view of a truck frame that is provided with the support structure shown in FIG. 1.

Referring to FIGS. 2 and 3, a pickup truck bed 36 is shown to include a gooseneck access opening 38 and four fifth wheel mounting pad access openings 40. The gooseneck ball receiver 16 and mounting pads 22 extend above the support structure and through their respective access openings 38 and 40.

As shown in FIG. 3, the support structure assembly 10 is attached to the truck bed frame rails 42.

The gooseneck ball receiver 16 and the fifth wheel pedestal mounting pads 22 extend upwardly from the support structure assembly 10 and are aligned with the gooseneck access openings 38 and fifth wheel mounting pad access openings 40 in the pickup truck bed 36, respectively, as shown in FIG. 2.

Figure 4:
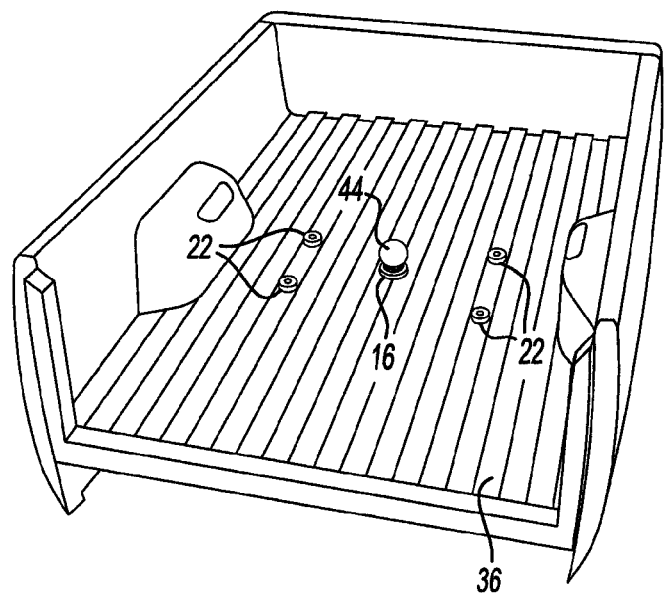
FIG. 4 is a rear perspective view of a pickup truck bed as shown in FIG. 2 that also includes a gooseneck hitch ball.
Figure 5:
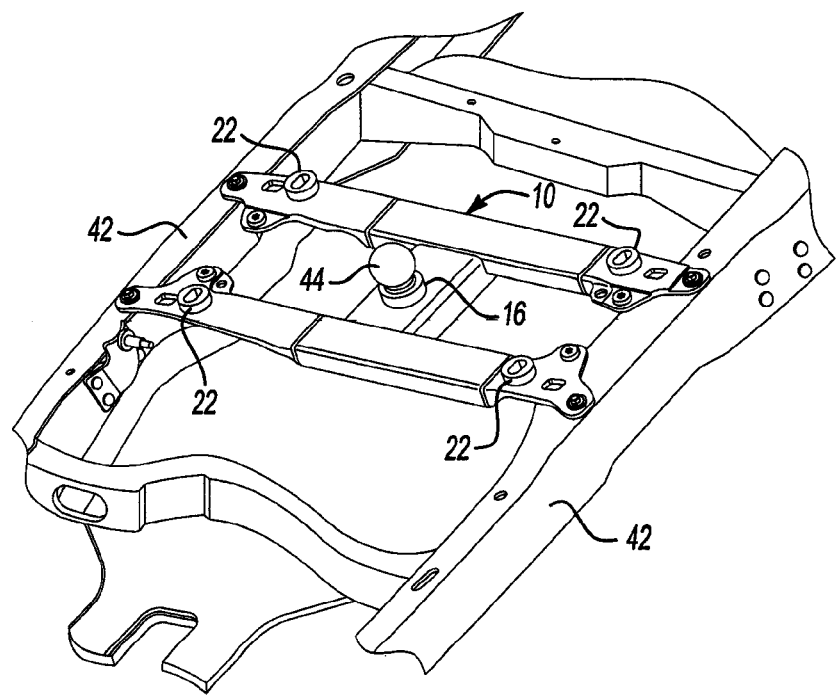
FIG. 5 is a rear perspective view of a truck frame that is provided with the support structure and a gooseneck hitch ball.

Referring to FIGS. 4 and 5, the pickup truck bed 36 is shown with a gooseneck quick connect receiver ball 44 assembled to the gooseneck ball receiver 16. The fifth wheel mounting pads 22 may be used to secure the safety chains of the trailer to the bed of the truck when the trailer is assembled to the gooseneck quick connect receiver ball 44. As shown in FIG. 5, the support structure assembly 10 is secured to the frame rails 42. The gooseneck quick connect receiver ball 44 and the fifth wheel pedestal mounting pads 22 are shown assembled to the support structure assembly 10.

The gooseneck ball 44 may incorporate a locking mechanism that secures the hitch structure of the trailer to the truck. The gooseneck ball locking mechanism provides tamper resistance when the trailer is connected to the truck. The center of the gooseneck ball is preferably located approximately 76 mm (3 inches) forward of the rear axle. The center of the four fifth wheel pedestal mounting pads 22 is approximately 55 mm (2.17 inches) forward of the rear axle.

Figure 6:
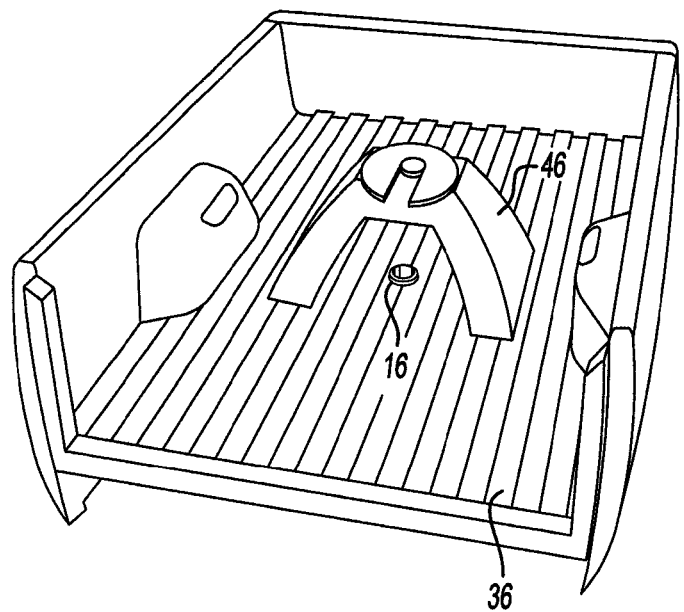
FIG. 6 is a rear perspective view of a pickup truck bed as shown in FIG. 2 that also includes a fifth wheel hitch pedestal installed.
Figure 7:
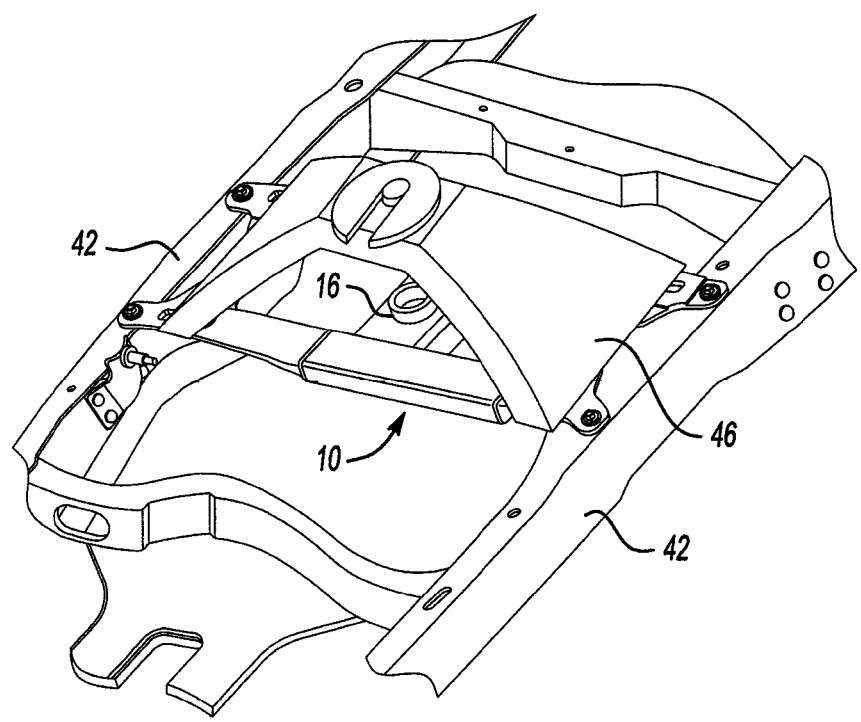
FIG. 7 is a rear perspective view of a truck frame that is provided with the support structure and a fifth wheel hitch pedestal installed.

Referring to FIGS. 6 and 7, the pickup truck bed 36 is shown with a fifth wheel receiver pedestal 46 assembled to the support structure 10. The fifth wheel receiver pedestal 46 includes locking pins (not shown in FIGS. 6 and 7) that lock the pedestal 46 to the fifth wheel mounting pads 22. The locking pins lock the fifth wheel receiver pedestal 46 to the support structure 10, as described with reference to FIG. 10 below.

Referring to FIG. 7, the entire support structure assembly 10 is assembled below the pickup truck bed 36 and is attached to the frame rails 42. The fifth wheel receiver pedestal 46 is assembled to the support structure assembly 10. The frame rail 42 and the support structure assembly 10, as shown in FIG. 7, are disposed below the pickup truck bed 36, as shown in FIG. 6. The fifth wheel receiver pedestal 46 is assembled to the support structure assembly 10 through the fifth wheel mounting pad access openings 40 and is locked in place by means of the locking pins that are described below.

Figure 8:
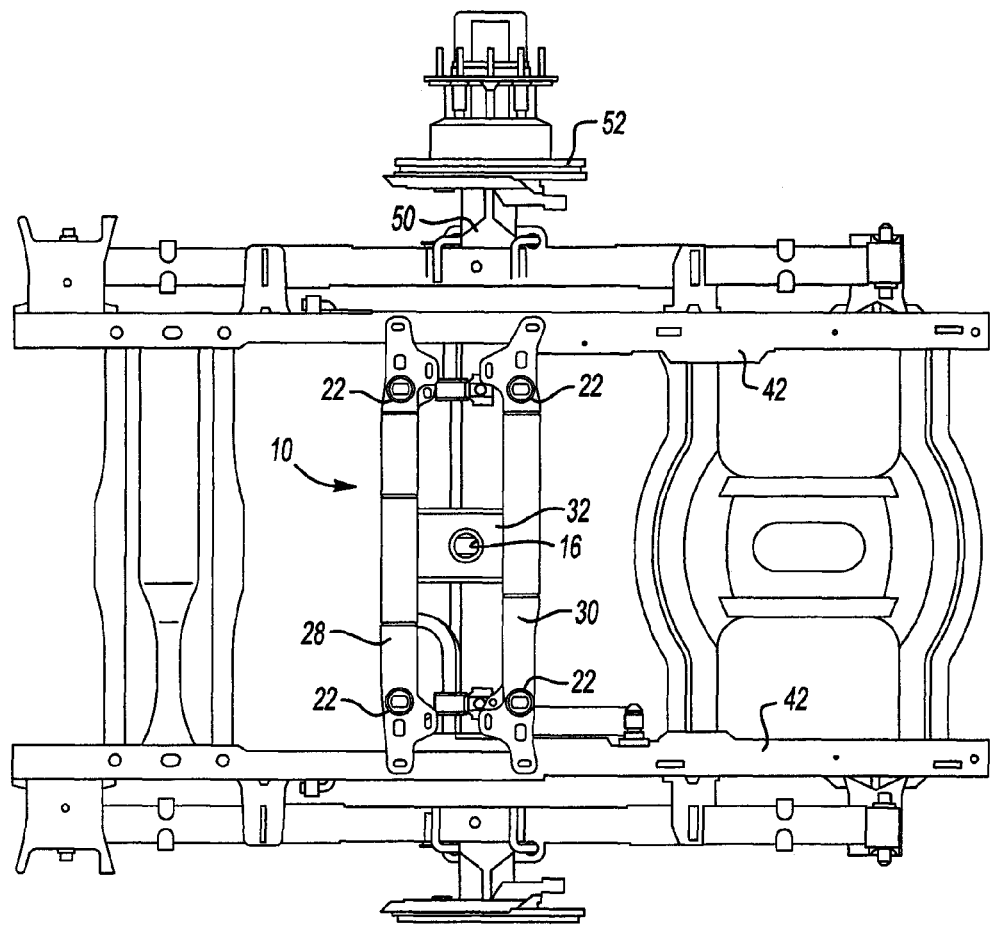
FIG. 8 is a top plan view of a pickup truck bed frame and rear axle with the integrated support structure for either a fifth wheel hitch or a gooseneck trailer hitch shown assembled to a pickup truck bed frame.

Referring to FIG. 8, the support structure assembly 10 is shown secured to the truck bed frame rails 42. The gooseneck ball receiver 16 is disposed in the central bridging portion 32 between the front transverse bar portion 28 and the rear transverse bar portion 30. The fifth wheel mounting pads 22 are shown and are integrally formed as part of the end inserts 18A-D that are assembled to the body portion 12 of the support structure assembly 10. Opposite lateral ends of the support structure assembly 10 are assembled to the frame rails 42 as previously described.

Referring to FIG. 8, the support structure assembly 10 is shown in a plan view as it is attached to the top surface of the truck frame rails 42. The support structure assembly 10 is located over a rear axle 50 with the gooseneck ball receiver 16 being located forward of the center line of the axle 50. Mounting pads 22 are shown with the center of the array of four mounting pads 22 being approximately 55 mm forward of the central axis of the rear axle 50. A rear wheel brake rotor 52 is shown assembled to the rear axle 50.

It should be understood that generally only one of either the receiver pedestal 46 or quick connect receiver ball 44 would be assembled to the support structure 10. The support structure 10 is intended to accommodate either a fifth wheel trailer or gooseneck trailer for towing by the vehicle.

Figure 9:
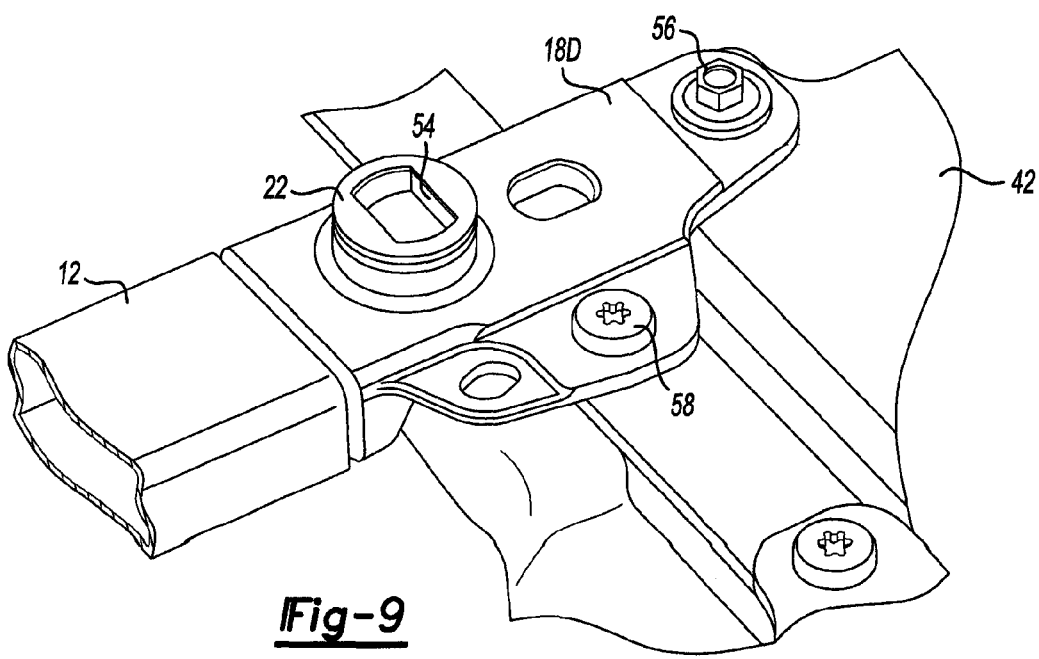
FIG. 9 is a fragmentary perspective view of one end insert portion showing the end insert portion secured to the truck bed frame.

Referring to FIG. 9, end insert 18D is shown as it is received in the tubular body portion 12. The mounting pad 22 is cast as part of the end insert 18D and is machined to include a slot 54. The end insert 18D is assembled to the frame rail 42 by a fastener 56. A flag bolt 58 includes a flat nut (not shown) that facilitates securing the bolt to the frame rail 42.

Figure 10:
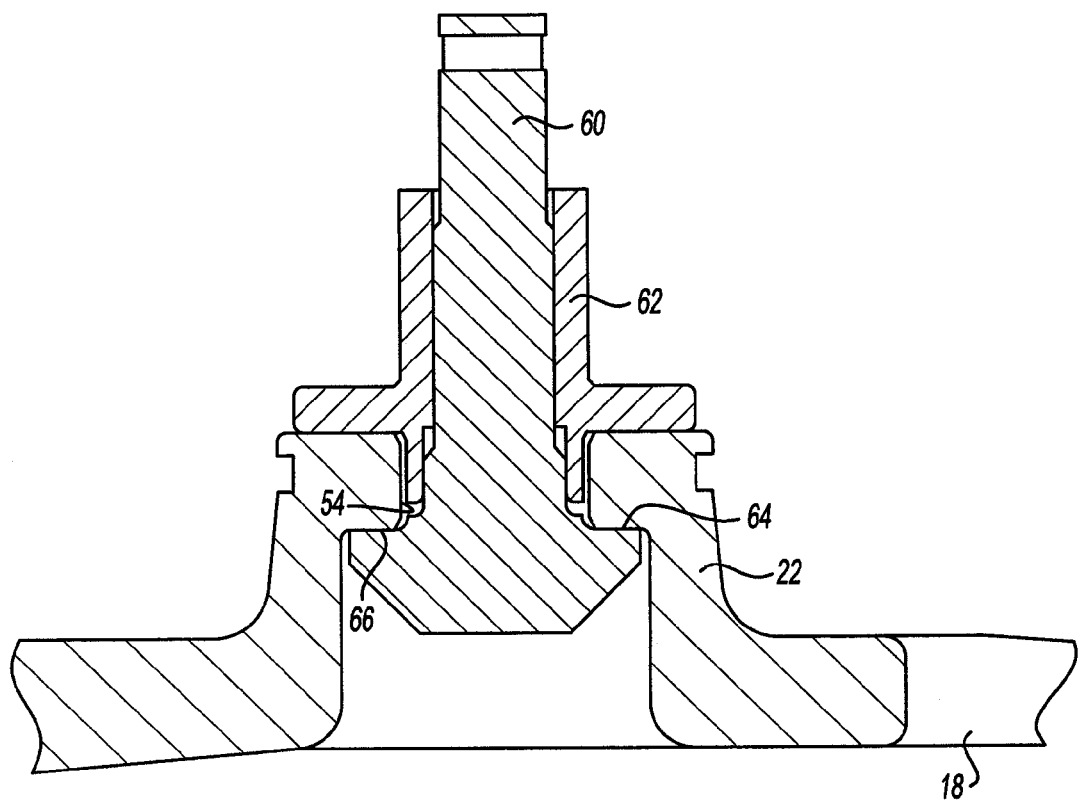
FIG. 10 is a cross-sectional view of a quarter turn locking pin received in a mounting pad.

Referring to FIG. 10, a mounting pad 22 that is integrally formed as part of one of the end portions 18A-D is shown in cross-section. A quarter turn locking pin 60 is shown as received in the slot 54 of the mounting pad 22. The quarter turn locking pin 60 rotates within a bushing 62 between the locking position as shown in FIG. 10 and a release position. In the locking position, a pair of shoulders 64 on the pin 60 engage a lip 66 formed inside the mounting pad 22. In the release position, the shoulders 64 are rotated 90° to clear the lip 66 and allow the pin 60 to be removed from the mounting pad 22. The integral mounting pads 22 provide a robust receptacle for the quarter turn locking pins 60 that securely retain the fifth wheel receiver pedestal 46 on the truck bed 36.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for attaching either a fifth wheel trailer hitch or a gooseneck trailer hitch to a truck bed comprising:
    a body having a central portion and a plurality of tubular end portions;
    a plurality of end inserts that are each received in one of the tubular end portions and are attached to at least one truck frame rail below the truck bed;
    a gooseneck ball receiver attached to a central portion of the body and aligned with a gooseneck opening in the truck bed, wherein a gooseneck ball is selectively attached to the gooseneck ball receiver;
    a plurality of mounting pads integrally formed as part of the end inserts that are aligned with a corresponding plurality of pedestal access openings in the truck bed;
    a fifth wheel receiver pedestal that is assembled to the mounting pads; and
    wherein one of the trailer hitches may be selectively attached to the truck bed, either the gooseneck trailer hitch may be attached to the gooseneck ball or the fifth wheel trailer hitch may be attached to the fifth wheel receiver pedestal.

2. The apparatus of claim 1 wherein the fifth wheel pedestal that is selectively attached to the plurality of mounting pads through the pedestal access openings, wherein the truck bed is unobstructed when the fifth wheel pedestal is not attached to the plurality of mounting pads.

3. The apparatus of claim 1 wherein the plurality of mounting pads are disposed laterally outboard of the central portion.

4. The apparatus of claim 1 wherein the body is generally H-shaped and wherein the gooseneck ball receiver is attached to the cross bar of the H-shaped body portion.

5. The apparatus of claim 1 wherein the gooseneck ball receiver is a quick connect receptacle.

6. The apparatus of claim 1 further comprising a fifth wheel pedestal that is selectively attached to the plurality of mounting pads through the pedestal access openings, wherein the fifth wheel pedestal has a plurality of quarter turn locking pins that are each secured to one of the mounting pads.

7. The apparatus of claim 1 wherein the plurality of end inserts receive fasteners that attach to the end inserts to at least one frame rail.

8. The apparatus of claim 1 wherein the body has a front transverse bar portion and a rear transverse bar portion that are interconnected by the central portion of the body, wherein two inserts including integrally formed mounting pads are received in the end portions of the front transverse bar portion and two end inserts including integrally formed mounting pads are received in the rear transverse bar portion.

9. An integrated support structure for hitching a trailer to a truck bed comprising:
   a body disposed below the truck bed;
   a plurality of end inserts that are attached to the body, wherein each end insert has a mounting pad integrally formed as part of the end insert;
   a fifth wheel trailer pedestal that is selectively secured to the mounting pads;
   a gooseneck trailer hitch that is selectively secured to a gooseneck ball receiver that is attached to the body; and
   wherein the trailer is hitched to either the gooseneck trailer hitch or the fifth wheel trailer pedestal.

10. The integrated support structure of claim 9 wherein the fifth wheel pedestal is attached to the mounting pads through corresponding pedestal access openings in the truck bed.

11. The integrated support structure of claim 9 wherein the body is generally H-shaped and wherein each of the end inserts is attached to one of the ends of the H-shaped body portion.

12. The integrated support structure of claim 9 wherein the body is generally H-shaped and wherein the gooseneck ball receiver is attached to a cross bar of the H-shaped body portion.

13. The apparatus of claim 9 wherein the end inserts are attached to opposite lateral ends of the body and are attached to at least one frame rail below the truck bed.

14. The integrated support structure of claim 9 wherein the body has a front transverse bar portion and a rear transverse bar portion that are interconnected by the central portion of the body, wherein two end inserts are assembled to the front transverse bar portion and two end inserts are assembled to the rear transverse bar portion.

15. A method of making an integrated support structure for alternatively attaching a fifth wheel trailer hitch or a gooseneck trailer hitch to a truck bed of a truck, the method comprising:
   providing a body having a plurality of open tubular ends;
   casting a plurality of end inserts that include integrally cast mounting pads;
   assembling the end inserts into the open tubular ends of the body;
   assembling a gooseneck ball receiver to the body; and
   assembling the body including the end inserts and the gooseneck ball receiver to a frame of the truck below the truck bed and aligning a gooseneck access opening with the gooseneck ball receiver and aligning mounting pad access openings with the mounting pads; and
   selectively attaching a fifth wheel pedestal to the truck bed by securing the fifth wheel pedestal to the mounting pads or attaching a gooseneck ball to the truck bed by securing the gooseneck ball to the gooseneck ball receiver.

* * * * *